United States Patent
Khermosh

(10) Patent No.: US 8,126,335 B2
(45) Date of Patent: Feb. 28, 2012

(54) METHODS AND APPARATUS FOR NEXT GENERATION ACCESS PASSIVE OPTICAL NETWORKS

(75) Inventor: Lior Khermosh, Givatayim (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 478 days.

(21) Appl. No.: 12/475,530

(22) Filed: May 31, 2009

(65) Prior Publication Data

US 2009/0304385 A1 Dec. 10, 2009

Related U.S. Application Data

(60) Provisional application No. 61/059,771, filed on Jun. 8, 2008.

(51) Int. Cl.
*H04B 10/00* (2006.01)

(52) U.S. Cl. ............... 398/168; 398/140; 398/58

(58) Field of Classification Search ............ 398/168, 398/140, 58
See application file for complete search history.

(56) References Cited

U.S. PATENT DOCUMENTS

2009/0060507 A1* 3/2009 Effenberger et al. ........... 398/60
2010/0290782 A1* 11/2010 Lee et al. ..................... 398/58

* cited by examiner

Primary Examiner — Kinam Park
(74) Attorney, Agent, or Firm — Mark M. Friedman

(57) ABSTRACT

Methods and apparatuses for controlling transmission of converged data packets and for media access through a single next generation access (NGA) passive optical network (PON) which can coexist with EPON and GPON based systems and can interoperate with a 10 GEPON. A converged data packet is transmitted between a first node and a second node of the NGA network under NGA management control. The converged packet has a format which unifies a GEM header with the 10 GEPON preamble header and certain fields replaced in a EPON packet format to accommodate information corresponding to the preamble elements of a GEM packet. The converged data can be encoded in the line code of the 10 GEPON protocol, allowing use of a control protocol based either on MPCP or GTC for the NGA. Node apparatuses include NGA elements which enable preparation, encoding/decoding and transmission of converged packets.

26 Claims, 13 Drawing Sheets

METHODS AND APPARATUS FOR NEXT GENERATION ACCESS PASSIVE OPTICAL NETWORKS

CROSS REFERENCE TO RELATED APPLICATIONS

This application claims the benefit of U.S. provisional patent application 61/059,771 filed Jun. 8, 2008, which is incorporated herein by reference in its entirety.

FIELD OF THE INVENTION

This invention relates in general to passive optical networks (PON) and in particular to protocols, systems and methods used in such networks.

BACKGROUND OF THE INVENTION

Known PON communication protocols for 1 G (Gigabit per second) line rate include IEEE802.3ah—1 GEPON (Gigabit Ethernet PON), FSAN (Full Service Access Network) and ITU-T G.984.1/G.984.2/G.984.3/G.984.4 GPON (Gigabit PON). The IEEE802.3av protocol for 10 GEPON (10 Gigabit Ethernet PON) is also known.

FIG. 1A shows an EPON packet format. FIG. 1B shows a GPON encapsulation method (GEM) packet format. The meaning of each element or component in each figure may be found in the respective standards. The 1 GEPON and 10 GEPON control protocols are defined by the Multipoint Control Protocol (MPCP) given in the IEEE802.3ah (clause 64, 65) and IEEE802.3av clause (76, 77). The MPCP is packet based. Major MPCP concepts include time-stamping MPCP packets, sending grant packets in the downstream (DS) to indicate upstream (US) transmission slots, sending report packets in the upstream to indicate reported data in queues and auto-discovery and a registration protocol. The GPON transmission control protocol (GTC) is defined in ITU G.984.3 and includes management done through a GTC header provided in a GTC frame.

1 GEPON and 10 GEPON also include a higher level control protocol, the Operation Administration and Maintenance (OAM) protocol defined in IEEE802.3ah (clause 57). The OAM protocol is also packet based. The GPON higher level protocol is implemented by two types of messages—PLOAM messages and OMCI messages—defined in ITU G.984.3 and G984.4.

Next generation access (NGA) protocols are currently being developed. NGA includes the GPON next generation protocol marked as NGPON1, which includes XGPON1 (10 G/2.5 G) and XGPON2 (10 G/10 G). Current IEEE EPON specifications do not support GPON based communication protocols (including NGA GPON protocols), which leaves the market segmented. Therefore, there is a need for and it would be advantageous to have new methods, systems and protocols which allow different specifications to operate in coexistence in the same PON.

SUMMARY OF THE INVENTION

The invention provides, in various embodiments, NGA methods, systems and protocols for coexistence and convergence of NGA GPON with IEEE802.3av 10 GEPON. The invention allows compatibility or "coexistence" of different types of data (e.g. bitstream and packet) transmitted over PON communication links, defines a mutual control protocol which allows multiplexed transmission, and defines mutual media access control (MAC) and mutual management of NGA units (e.g. NGA OLTs and ONUs) with legacy 1 GEPON, GPON and 10 GEPON equipment.

The invention provides the following enhancements to the current protocol requirements:

Backward compatibility with GPON.
Compatibility with EPON and 10 GEPON.
Symmetrical NGA mode 10 G/10 G.
Asymmetrical NGA mode-10 G/2.5 G, 10 G/5 G.

The mutual media control protocol and management provided by the invention provides a new GPON Encapsulation Method (GEM) packet format which is compatible with 10 GEPON and which contains the GEM header information. It keeps the 10 GEPON data format—line rate, Physical Coding Sublayer (PCS), 64/66, forward error correction (FEC), scrambling and bit order—in both 10 G rate downstream and upstream transmissions, so that a 10 GEPON receiver can receive the data. It allows Time Division Multiplexing (TDM) between GPON US, 2.5 G, 5 G US and 10 G US transmissions and 1 GEPON US, 2.5 G, 5 G US and 10 G US transmissions.

According to the invention, there is provided a method for controlling transmission of data packets and for media access through a single NGA PON including the steps of: at a first node of the network, providing a converged data packet, transmitting the converged data packet under NGA management control to a second node of the network, and, at the second node, receiving the converged data packet and accepting the NGA management control.

In some embodiments of the method, the step of transmitting is performed by a device selected from the group consisting of a first node NGA device and a first node legacy device and the step of receiving is performed by a device selected from the group consisting of a second node NGA device and a second node legacy device In some embodiments of the method, the step of providing a converged data packet includes providing a packet with a format that unifies a GEM header with a 10 GEPON preamble header.

In some embodiments of the method, the providing a packet with a format that unifies a GEM header with a 10 GEPON preamble header includes providing a field used as both LLID for EPON devices and as a port ID for GPON devices.

In some embodiments of the method, the providing a packet with a format that unifies a GEM header with a 10 GEPON preamble header further includes retaining two GPON PTI/PLI bytes before the LLID.

In some embodiments of the method, the retaining includes retaining default value PTI/PLI bytes as EPON preamble values, thereby allowing reception by a legacy 10 GEPON device which ignores the PTI/PLI bytes.

In some embodiments of the method, the first node NGA device is a NGA OLT and the second node NGA device is a NGA ONU.

In some embodiments of the method, the first node NGA device is a NGA ONU and the second node NGA device is a NGA OLT.

In some embodiments of the method, the NGA management control includes a protocol based on the IEEE802.3av MPCP.

In some embodiments of the method, NGA management control includes a GPON based management extension which uses extended MPCP and OAM messages.

In some embodiments of the method, the GPON based management extension is negotiated between a NGA ONU and a NGA OLT.

In some embodiments of the method, the NGA management control includes a GTC based protocol control adapted for NGA between NGA devices.

In some embodiments of the method, the NGA management control is done in 500 μsec superframe cycles of four GTC frames of 125 μsec shifted in 0-3 bytes.

In some embodiments of the method, the GTC based protocol control includes management done through a GTC header encapsulated in NGA converged packets to maintain compatibility with a 10 GEPON device.

In some embodiments of the method, the NGA management control includes default NGA management control based on MPCP and the activation of a NGA management control in GTC mode is negotiated between a NGA ONU and a NGA OLT.

According to the invention, there is provided an apparatus for controlling transmission of data packets and for media access through a single NGA PON which includes an interface having a NGA GEM encapsulator module, a NGA Framer PCS module, at least one NGA serializer/deserialzer (SERDES) and burst mode clock data recovery (CDR) engine and a NGA optics module, wherein the NGA GEM encapsulator module is used for encoding and decoding a converged data packet, the NGA Framer PCS module is used for encoding data received from the NGA GEM encapsulator module and for decoding data received from the SERDES/CDR engine, the NGA SERDES/CDR is used for serializing the encoded data of the NGA Framer PCS module, for providing clock and data recovery and for deserializing data arriving from the NGA optical module, and the NGA optics module is used for combining burst mode transmission to the line and burst mode reception to the NGA SERDES/CDR engine.

In some embodiments of the apparatus, the interface is a NGA OLT interface.

In some embodiments of the apparatus, the interface is a NGA ONU interface.

In some embodiments of the NGA OLT interface, the interface further includes a PLOAM module connected to the OLT NGA framer module and used for providing GPON based NGA physical level management for the NGA OLT.

In some embodiments of the NGA OLT interface, the interface further includes an OMCI module connected to the OLT NGA GEM encapsulator module and used for providing GPON based NGA higher level management for the NGA OLT.

In some embodiments of the NGA OLT interface, the interface further includes an EPON OLT MAC module for 1 GEPON and 10 GEPON, an EPON OAM module and an OLT MPCP module, the EPON OLT MAC, EPON OAM and OLT MPCP modules connected to the OLT NGA GEM encapsulator module and used for enabling the NGA OLT to work with legacy 10 GEPON and 1 GEPON ONUs or NGA ONUs in EPON mode based on EPON and MPCP control.

In some embodiments of the NGA OLT interface, the interface further includes a bandwidth (BW) allocator/manager module connected to the OLT MPCP module and to the OLT NGA Framer PCS module and used for providing the NGA OLT control of the allocation of bandwidth in upstream and for separating different control protocols in downstream and upstream TDM or wavelength division multiplexed (WDM) transmission.

In some embodiments of the NGA ONU interface, the interface further includes a PLOAM module connected to the ONU NGA Framer PCS module and used for providing GPON based NGA physical level management for the NGA ONU.

In some embodiments of the NGA ONU interface, the interface further includes an OMCI module connected to the ONU NGA GEM encapsulator module and used for providing GPON based NGA higher level management for the NGA ONU.

In some embodiments of the NGA ONU interface, the interface further includes an EPON ONU MAC module for 1 GEPON and 10 GEPON, an EPON OAM module and an ONU MPCP module, the EPON ONU MAC, EPON OAM and ONU MPCP modules connected to the ONU NGA GEM encapsulator module and used for enabling the NGA ONU to work with legacy 10 GEPON and 1 GEPON OLTs or NGA OLTs in EPON mode based on the EPON and MPCP control.

In some embodiments of the NGA ONU interface, the interface further includes a BW reporting module connected to the ONU MPCP module and the ONU NGA Framer PCS module and used for providing the NGA ONU a BW report in the upstream transmission in a GTC header for GTC based NGA operation or for providing data to MPCP report messages in case of MPCP media access management.

BRIEF DESCRIPTION OF THE DRAWINGS

The invention is herein described, by way of example only, with reference to the accompanying drawings, wherein.

DETAILED DESCRIPTION OF THE INVENTION

The invention provides methods, apparatuses and protocols for controlling transmission of converged data packets and for media access through a single NGA network. The NGA network can coexist with EPON and GPON based systems and can interoperate with a 10 GEPON. In this description, a "converged" data packet is a packet prepared and framed according to a new NGA protocol suggested herein. The control of the transmission and media access, referred as "NGA management control", is done according to a new NGA protocol suggested herein.

Figure 1A:
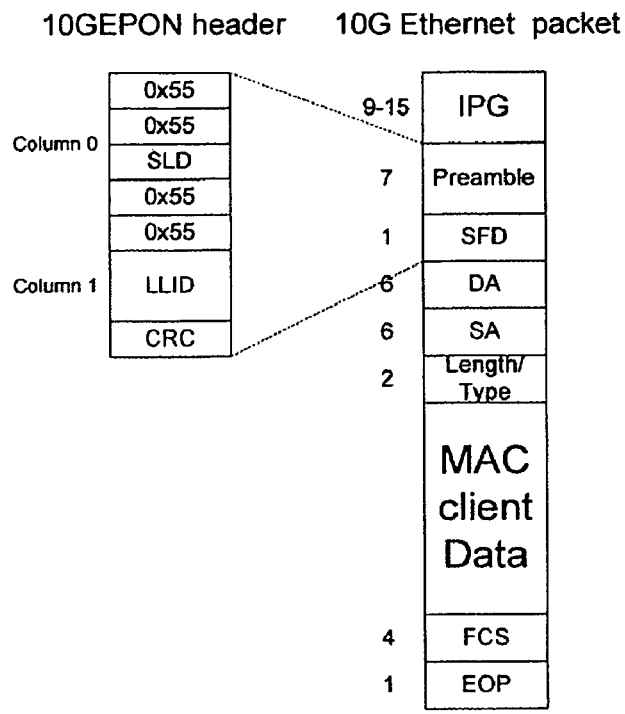
FIG. 1A shows an EPON packet format.
Figure 1B:
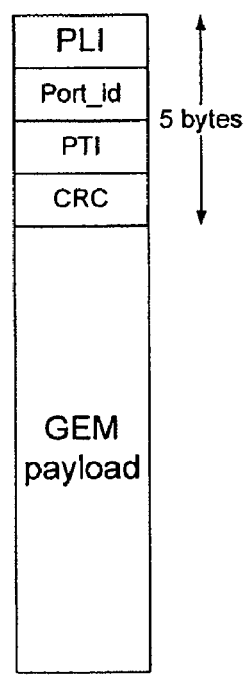
FIG. 1B shows a GEM packet format.
Figure 2:
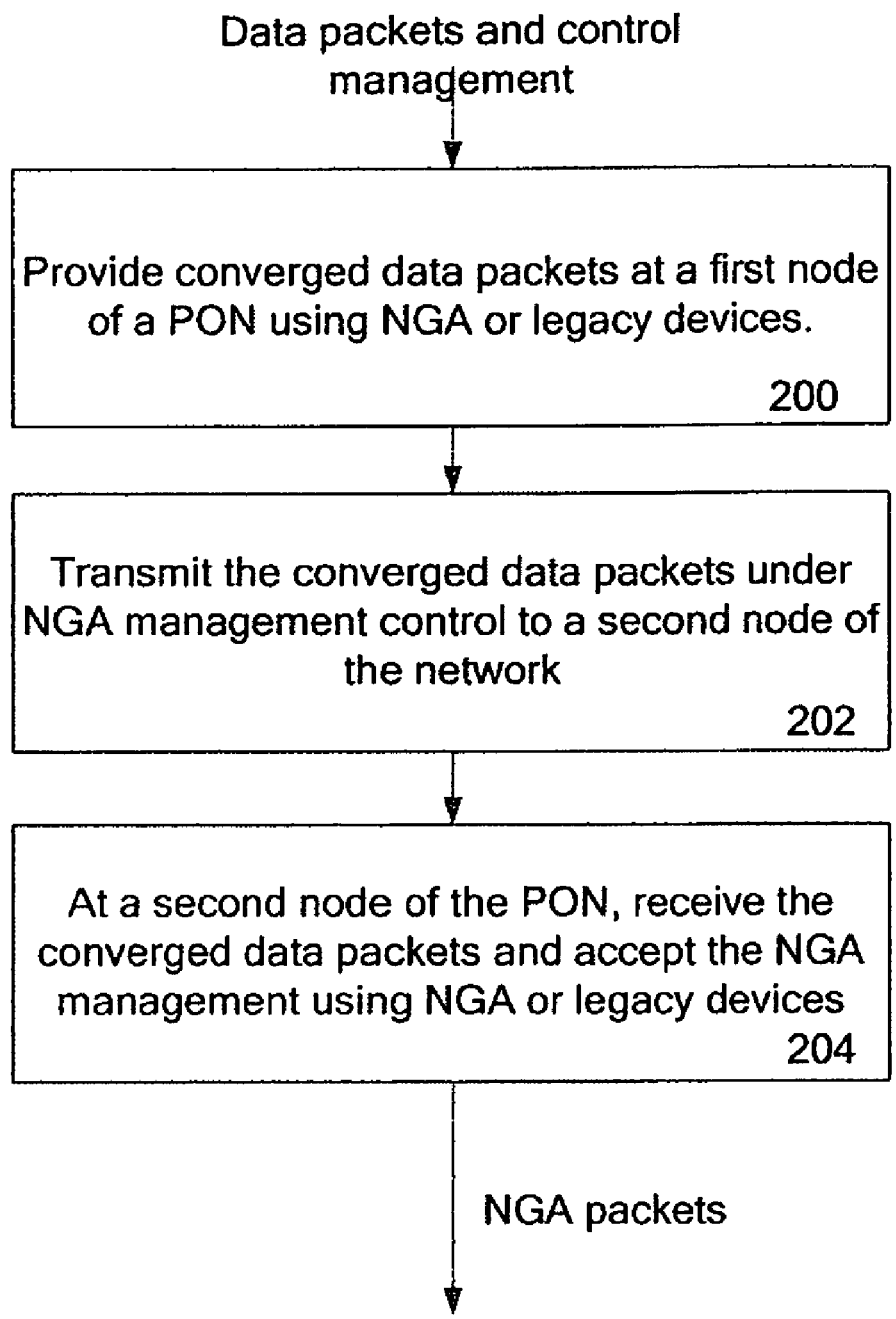
FIG. 2 shows a flow chart with the major steps of one embodiment of a method of the invention.

FIG. 2 shows a flow chart with the major steps of one embodiment of the method. Converged data packets and control management data are provided according to a new NGA protocol at a transmitting node of the NGA network in step 200. The converged data is transmitted to a receiving node of the NGA network, in either DS or US, under NGA management control in step 202. At the receiving node, the received converged data packets are processed to retrieve the data and the NGA management control is accepted in step 204.

In DS transmissions, the transmitting node is a NGA OLT and the receiving node is either a NGA ONU, a legacy GPON/1 GEPON ONU or a legacy 10 GEPON ONU. Alternatively, the transmitting node is a legacy GPON/1 GEPON/ 10 GEPON OLT and the receiving node is a NGA ONU. In US transmission, the transmitting node is a NGA ONU and the receiving node is a NGA OLT or a legacy GPON/1 GEPON/10 GEPON OLT. Alternatively, the transmitting node is a legacy GPON/1 GEPON/10 GEPON ONU and the receiving node is a NGA OLT.

Figure 3:
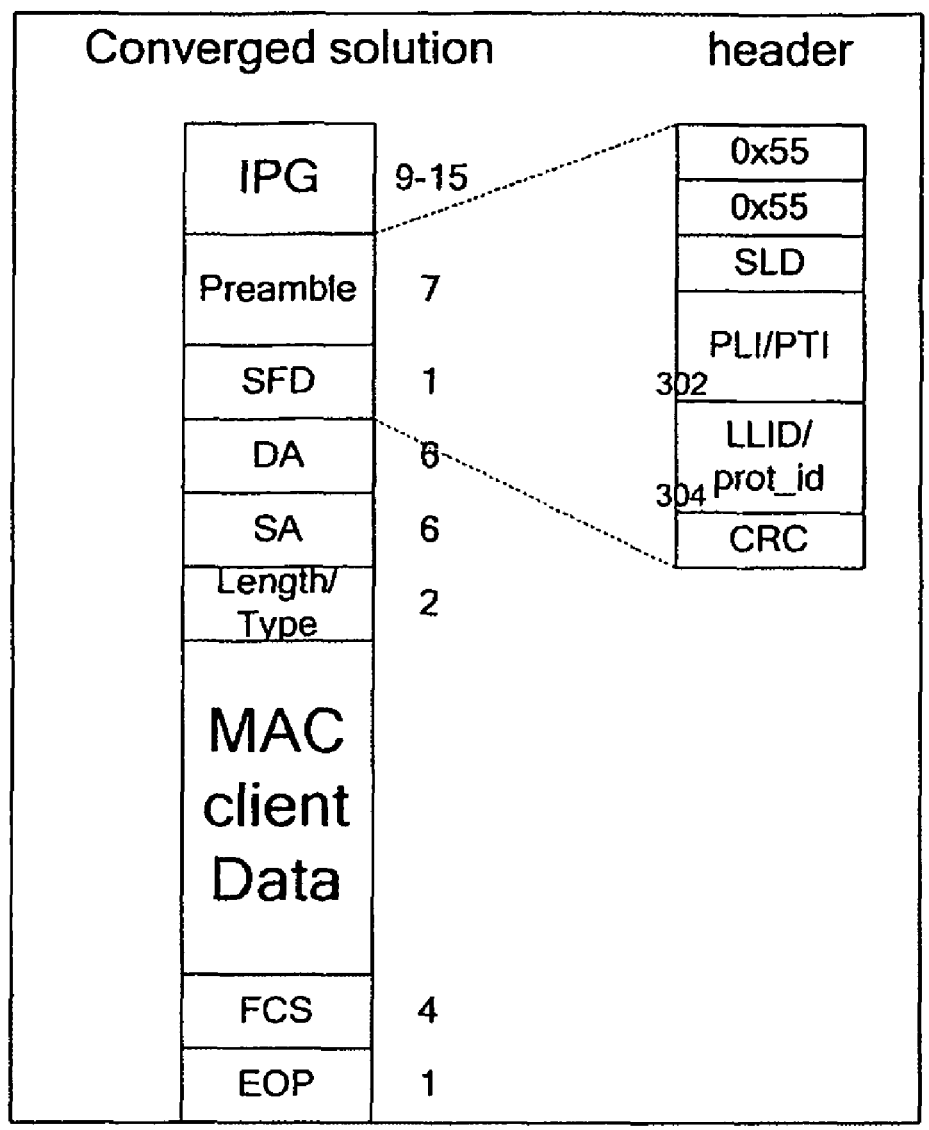
FIG. 3 shows a converged packet format of the invention.

A converged packet format is shown in FIG. 3. The converged packet format unifies a GEM header with a 10 GEPON preamble header. It includes an EPON packet format, with certain fields replaced to accommodate information corresponding to the preamble elements of a GEM packet. The fields in a converged packet have default values which enable backward compatibility with the EPON frame. A field 304 is used as the Logical Link ID (LLID) for EPON and as port ID (15 bits+1 bit broadcast) of GPON. A GPON packet Payload Type Indicator (PTI) and Payload Length Indicator (PLI) (field 302) can be optionally maintained in the preamble (two) bytes before the LLID.

In use, a legacy Ethernet 10 GEPON receiver ignores the PLI/PTI bytes (0×55 0×55). The PLI/PTI bytes are interpreted by either a new NGA receiver or by a legacy 10 GEPON receiver as marking the frame to be a non-fragmented packet (PTI=001). Note that the GPON protocol allows fragmentation, while the Ethernet protocol does not. The PTI field in the GPON GEM frames indicates if the packet is a fragment. 10 GEPON packets are Ethernet packets and therefore are not fragmented.

Figure 4:
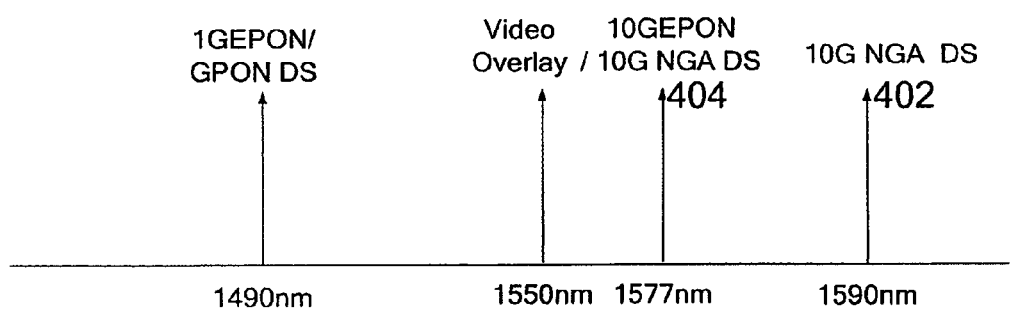
FIG. 4 shows an exemplary wavelength plan in an embodiment of 10 NGA downstream transmission according to the invention.

FIG. 4 shows an exemplary wavelength plan in an embodiment of 10 NGA DS transmission according to the invention, which enables the coexistence of NGA, GPON, 1 GEPON and 10 GEPON. The NGA DS data is transmitted in a different wavelength than the 1 GEPON and GPON wavelengths. The figure presents exemplary options of wavelength allocations, in addition to the existing wavelengths of GPON/1 GEPON/10 GEPON and of a video overlay. The particular wavelength selection is done based on a variety of considerations which include neighbor wavelength allocation (for instance allocation for video overlay and legacy standards), laser performances and dispersions, filter frequency and sharpness (which result in reduced cost) and the performance of legacy filters.

The NGA DS data may be transmitted at a different wavelength that in 10 GEPON (402), or, to save wavelength, at the same wavelength as in 10 GEPON (404). For the 10 GEPON wavelength 404, the NGA DS transmission is at a rate of 10.35 Gbps, using the PCS and data framing of the 10 GEPON as given in IEEE802.3av clause 76. The data is encapsulated into 64b/66b 10 GEPON Ethernet codewords, with the 10 GEPON FEC adding 4 parity (66 bit) codewords to every 27 codewords of data (66 bit codewords). This allows a 10 GEPON receiver to decode the data, an important advantage for coexistence between EPON and GPON scenarios. Note that FEC is mandatory in 10 GEPON.

Figure 5:
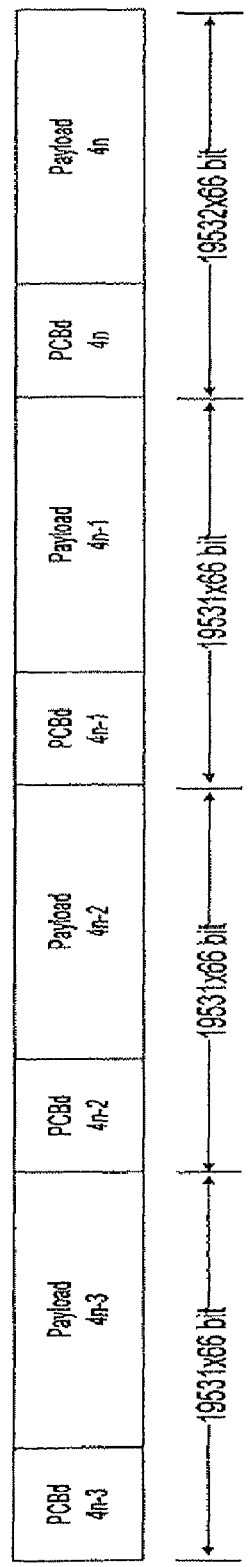
FIG. 5 shows an embodiment of a GTC layer based framing for 10 G NGA downstream transmission according to the invention.

FIG. 5 shows an embodiment of a GTC layer-based framing for the 10 G NGA DS transmission according to the invention. A GPON GTC cycle includes four frames, each of 125 μsec. This 500 μsec GTC cycle is a multiple of a full bit stream. This allows a GPON based receiver to use the NGA framing. There is a minor modification in this superframing to the Sync pattern vs. the legacy GTC, in that the Sync pattern can move in a single position between the four frames, and the Last frame has an additional codeword. The Physical Control Block (PCB) header is a multiple of 66 bit line codewords. The PCS layer is the same as in the 10 GEPON. There is a continuous stream of FEC blocks in the DS. Synchronization is done on the Sync headers of the 64/66 blocks, as done in 10 GEPON. The legacy GTC is also adapted to the NGA in features such as adapting allocations and reporting to the new line rate needed from the NGA operation.

Figure 6:
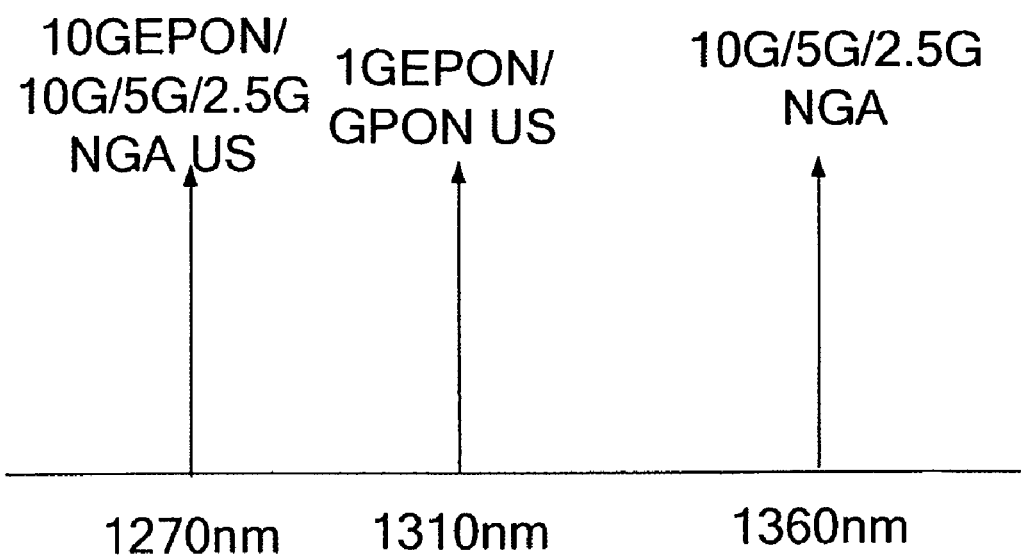
FIG. 6 shows an exemplary wavelength plan in an embodiment of 10 NGA upstream transmission according to the invention.

FIG. 6 shows an exemplary wavelength plan in an embodiment of 10 NGA US transmission according to the invention, which enables the coexistence of NGA, GPON, 1 GEPON and 10 GEPON. The NGA US transmission may use a different wavelength than the GPON, 1 GEPON or 10 GEPON wavelength, or may use the same wavelength as the 10 GEPON and overlap with the 1 GEPON wavelength and use a TDM separation to prevent overlap of protocols The particular wavelength selection may be based on a variety of considerations which include neighbor wavelengths allocation, laser performances and dispersions, filter frequency and sharpness (which result in increased cost) and the performance of legacy filters.

For example, the NGA US data may be transmitted at three rates of 10 G, 5 G or 2.5 G. The 10 G rate can be 10.3125 Gbps of 10 GEPON line rate with the same PCS and data format as for the 10 GEPON, this allowing a 10 GEPON OLT to "understand" the transmission of a NGA ONU. The 2.5 G rate can be 2.488 Gps as in the GPON rate and the 5 G rate can be 4.976 Gbps (doubling the rate of the 2.5 G). FEC can be optional in these rates, also because the link budget is more relaxed and because the protocol does not need to coexist.

In embodiments using TDM for US transmission, the number of packets may not fit exactly in an allocation (grant). The GPON protocol uses packet fragmentation to increase the line efficiency, while the EPON protocol does not fragment packets. To keep compatibility with a 10 GEPON receiver, the invention manages transmission in both US and DS 10 G NGA without fragmentation, although it has GPON type features. This is important for coexistence, since if a NGA ONU is connected to a 10 GEPON OLT, the data can be understood by this OLT. The packets in the NGA 2.5 G and 5 G US transmission can still be fragmented to increase the line efficiency.

As a GEPON based protocol includes certain control features which are wider than an EPON control protocol, it is possible to extend the MPCP to include these features by inserting in the GPON PLOAM messages on MPCP packets. An optional control protocol that may be implemented in an NGA device includes a GPON based control including GTC based bandwidth (BW) mapping allocations and reporting through the GTC header by Dynamic Bandwidth Report Upstream (DBRu) (GPON header field for report) and all other GPON based protocol items. EPON devices cannot support the GTC based control protocol, so a GTC based NGA can be implemented only if 10 GEPON devices do not exist in the network. The allocation and data on the line in this case may exemplarily look like as in FIG. 7.

Figure 7:
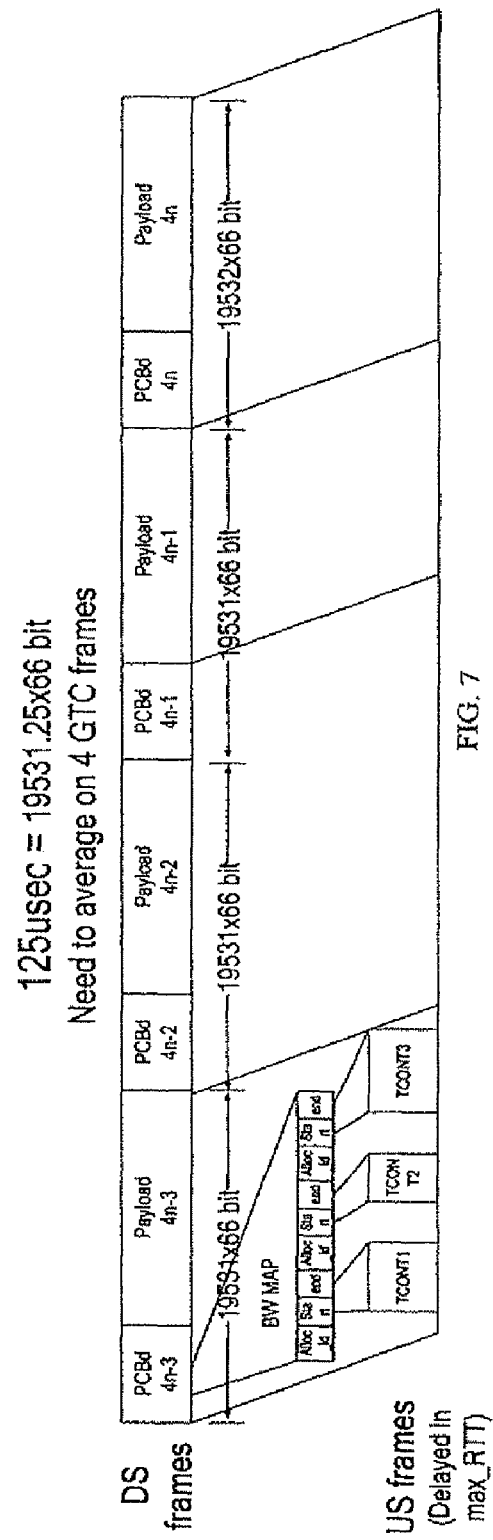
FIG. 7 shows an embodiment of DS data based on a GTC frame for 10 G rates together with US data for the 2.5 G, 5 G and 10 G rates.

FIG. 7 shows an embodiment of DS data based on a GTC frame for 10 G rates as provided in the NGA, together with US data for the 2.5 G, 5 G and 10 G rates. The figure presents the allocations done in the DS BW map filled for the US transmission as well as the US transmission itself As shown, allocation is done by multiplication of FEC blocks (as done in the 10 GEPON) for the 10 G rates. The US transmission BW map allocation is done using counting bytes or words or blocks in the different US rate granularity. The allocations cannot exceed the frame size.

The invention also provides a MAC protocol required for coexistence. The mandatory control implemented in an NGA device includes support of the IEEE802.3av MPCP. This allows a NGA OLT to control a system with 1 GEPON and 10 GEPON ONUs and allow a NGA ONU to work with a NGA OLT and a 1 GEPON or 10 GEPON OLT. The allocation and data on the line in this case may exemplarily look like as in FIG. 8.

Figure 8:
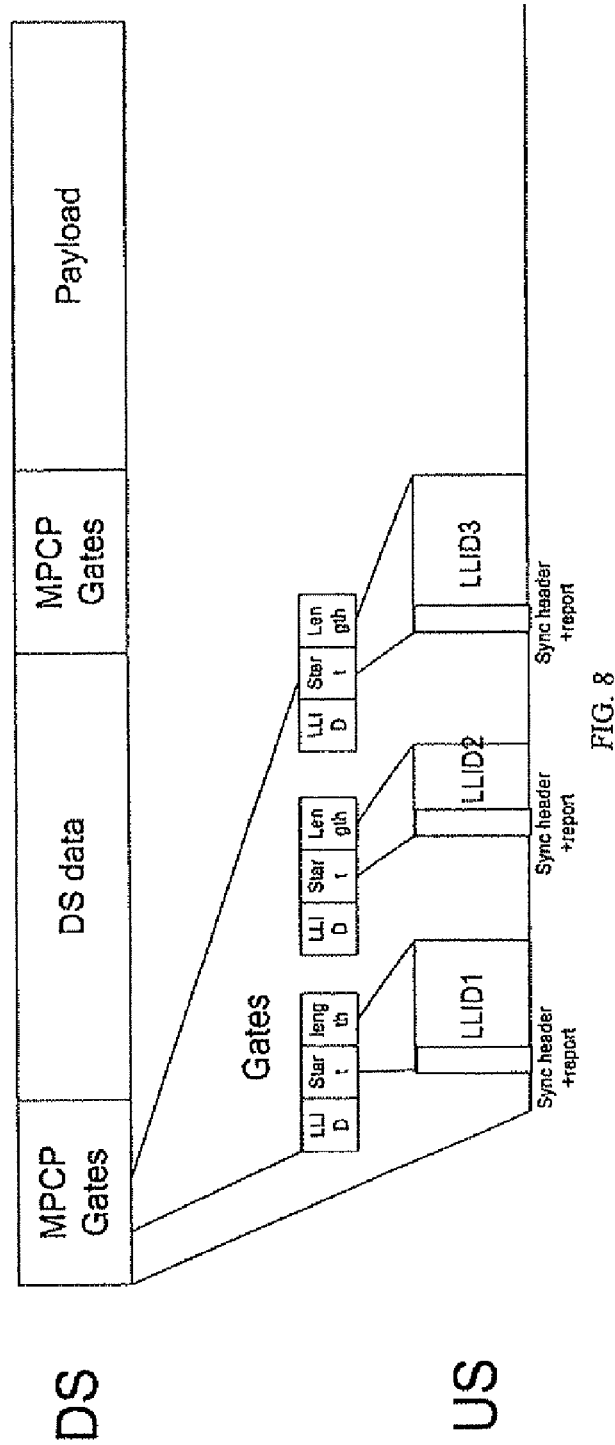
FIG. 8 shows an exemplary embodiment of NGA DS data based on a MPCP frame for 10 G rates as provided by the invention.

FIG. 8 shows an exemplary embodiment of NGA DS data based on a MPCP frame for 10 G rates. The figure also shows exemplary US data for the 2.5 G, 5 G and 10 G rates. Grants and reports are in IEEE802.3ah TimeQuanta (TQs) of 16 nsec. The figure shows the allocations done in the DS MPCP messages filed for the US transmission and the according transmission at the US, as well as the reporting done in MPCP messages. As shown, allocation can be done by multiplication of FEC blocks (as done in the 10 GEPON) for the 10 G rates. The allocations cannot exceed the frame size.

A method of the invention also allows a GTC header to be encapsulated into an Ethernet packet. The data on the line can then be fully understood by a NGA device and by a 10 GEPON device, so the control protocol can be activated after a negotiation between the NGA devices on the network. The higher layer management for the NGA also includes the OAM required for coexistence. The mandatory OAM implemented in a NGA device includes support of the IEEE802.3av OAM. This allows a NGA OLT to control a system, with 1 GEPON and 10 GEPON ONUs and to allow a NGA ONU to work with a NGA 1 GEPON OLT or 10 GEPON OLT.

A GPON based protocol includes certain control features which are wider than EPON control protocol features and not included in it. These are referred to as "GPON based management extension". It is possible to extend MPCP and OAM messages to include these features by inserting in GPON PLOAM messages on MPCP packets and GPON OMCI messages on EPON OAM packets. An optional control protocol implemented in an NGA device includes GPON based PLOAM and OMCI control features.

Figure 9:
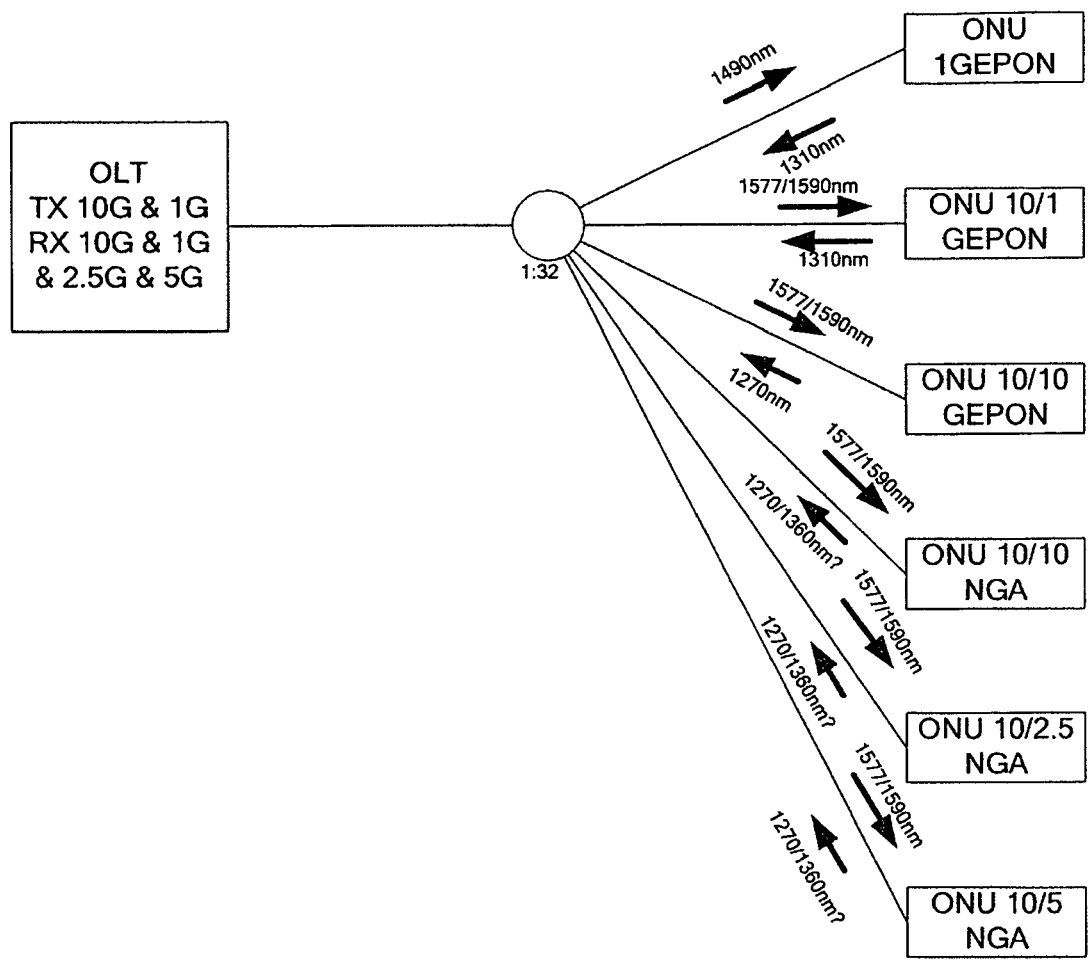
FIG. 9 shows an exemplary network with a NGA migration scenario with 1 GEPON and 10 GEPON, enabled by the invention.

FIG. 9 shows an exemplary network with a NGA migration scenario with 1 GEPON and 10 GEPON, enabled by the invention. Different types of NGA ONUs are connected with different types of 1 GEPON and 10 GEPON ONUs to a single OLT. 10/1, 10/10 10/2.5, 10/5 refer to DS/US transmission rates. The OLT is a "NGA OLT" described in more detail with reference to FIG. 11.

Figure 10:
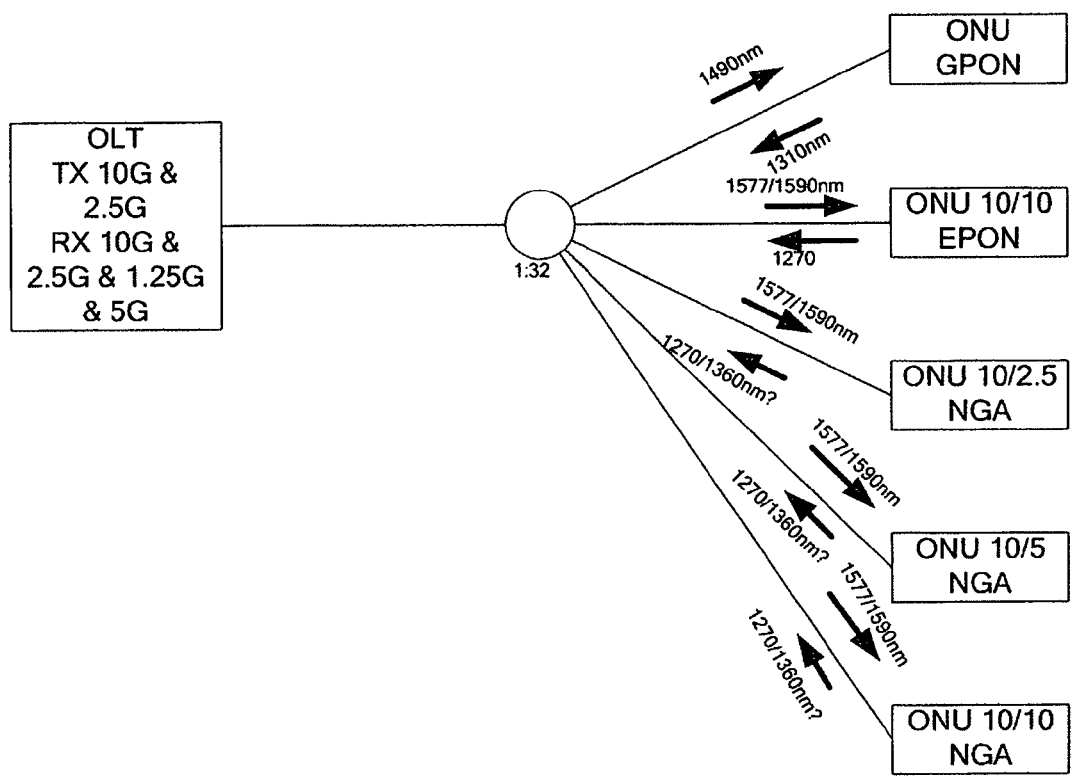
FIG. 10 shows an exemplary network with NGA migration scenario with GPON and 10 GEPON, enabled by the invention.

FIG. 10 shows an exemplary network with NGA migration scenario with GPON and 10 GEPON, enabled by the invention. The different types of NGA ONUs are connected with GPON and 10 GEPON ONUs to a single OLT. The DS/US transmission rate markings are similar to those in FIG. 9.

Figure 11:
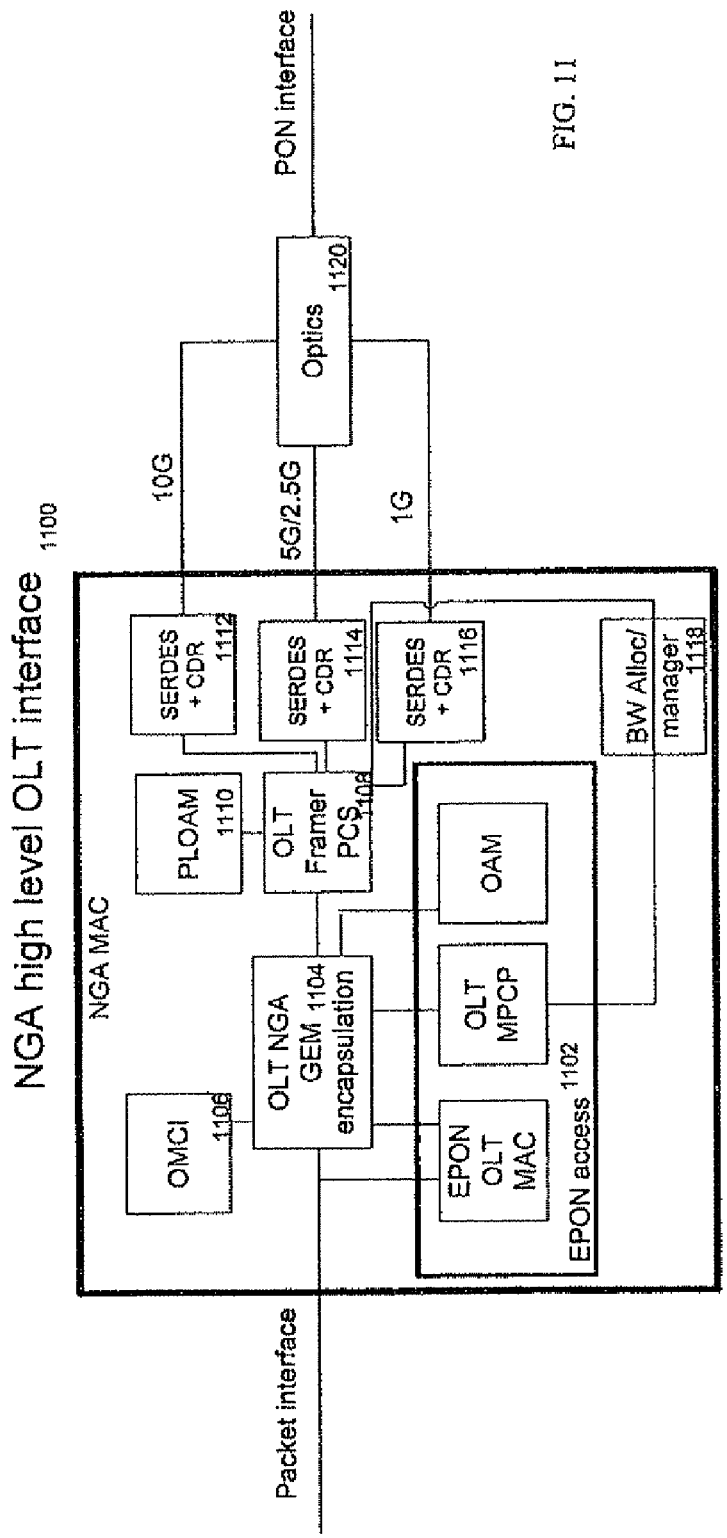
FIG. 11 shows a NGA OLT interface of the invention.

FIG. 11 shows a NGA OLT PON interface 1100 used in the invention. The NGA OLT PON interface includes an EPON access module 1102 having an EPON OLT MAC module, an OLT MPCP module and an OAM module, all well known in the art. The NGA OLT further includes an OLT NGA GEM encapsulation module 1104 for encoding and decoding a converged packet format, an OMCI module 1106 for encoding and decoding GPON based management for the NGA and an OLT Framer PCS module 1108 for encoding and decoding the converged packet for DS transmission with line code framing. The framing includes PCS framing of the data to be transmitted on the line (including 10 GEPON framing, FEC and 64/66) and NGA GTC framing. The NGA OLT further includes a PLOAM module 1110 for encoding and decoding a GPON based physical layer management for the NGA, three SERDES and burst mode CDR engines marked 1112, 1114, 1116 for each one of the NGA line rates, and a BW allocation/manager engine 1118 for controlling the allocation of the BW in the upstream and for the separation of the different control protocols (between 1 GEPON, 10 GEPON (MPCP), GPON and NGA GTC) in the downstream transmission and upstream in a TDM or WDM manner. Engine 1118 also provides the BW map allocation for the upstream transmission to each ONU and provides the data to the MPCP grants in case of MPCP media access management. The NGA OLT further includes an optics engine 1120 which combines all transmissions and burst mode receptions according to wavelength allocation. The components of the NGA OLT are interconnected as shown.

Figure 12:
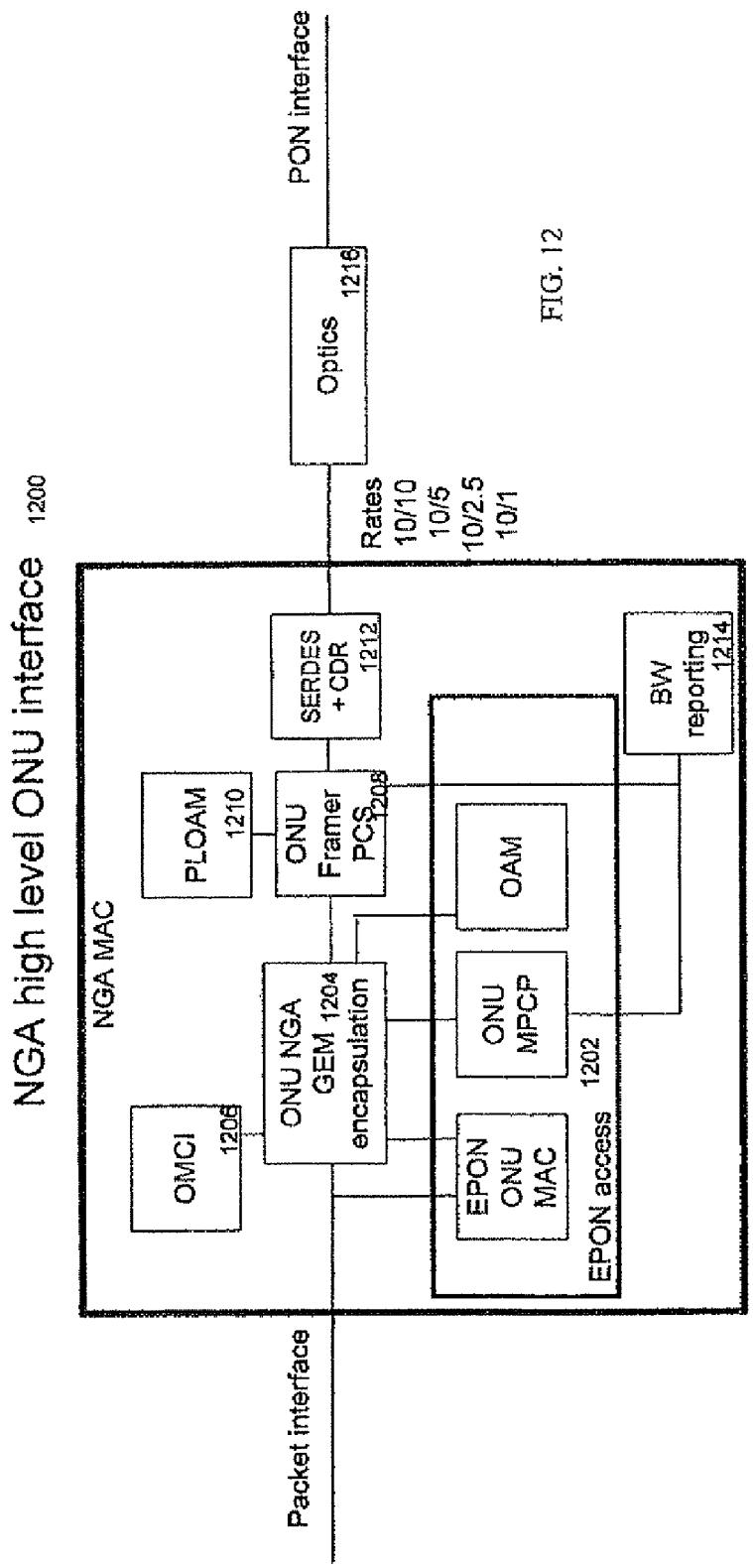
FIG. 12 shows a NGA ONU interface of the invention.

FIG. 12 shows an NGA ONU PON interface 1200 supporting the above NGA protocol of this invention. The NGA ONU includes an EPON access module 1202 having an EPON ONU MAC module, an ONU MPCP module and an OAM module, all well known in the art The NGA ONU further includes an ONU NGA GEM encapsulation module 1204 for encoding and decoding a converged packet format, an OMCI module 1206 for encoding and decoding a GPON based management for the NGA and an ONU Framer PCS module 1208 for encoding and decoding the converged packet for US transmission in line code framing. The framing includes PCS framing of the data to be transmitted on the line (including 10 GEPON framing, FEC and 64/66) and NGA GTC framing. The NGA ONU further includes a PLOAM module 1210 for encoding and decoding a GPON based physical layer management for the NGA, three Serializer/Deserialzer (SERDES) and Clock Data Recovery (CDR) engine marked 1212 for each of the NGA line rates, and a BW reporting engine 1214 for providing the BW report in the upstream. The NGA ONU further includes an optics engine 1216 which combines all burst mode transmissions and receptions according to wavelength allocation. The components of the NGA OLT are interconnected as shown.

Figure 13:
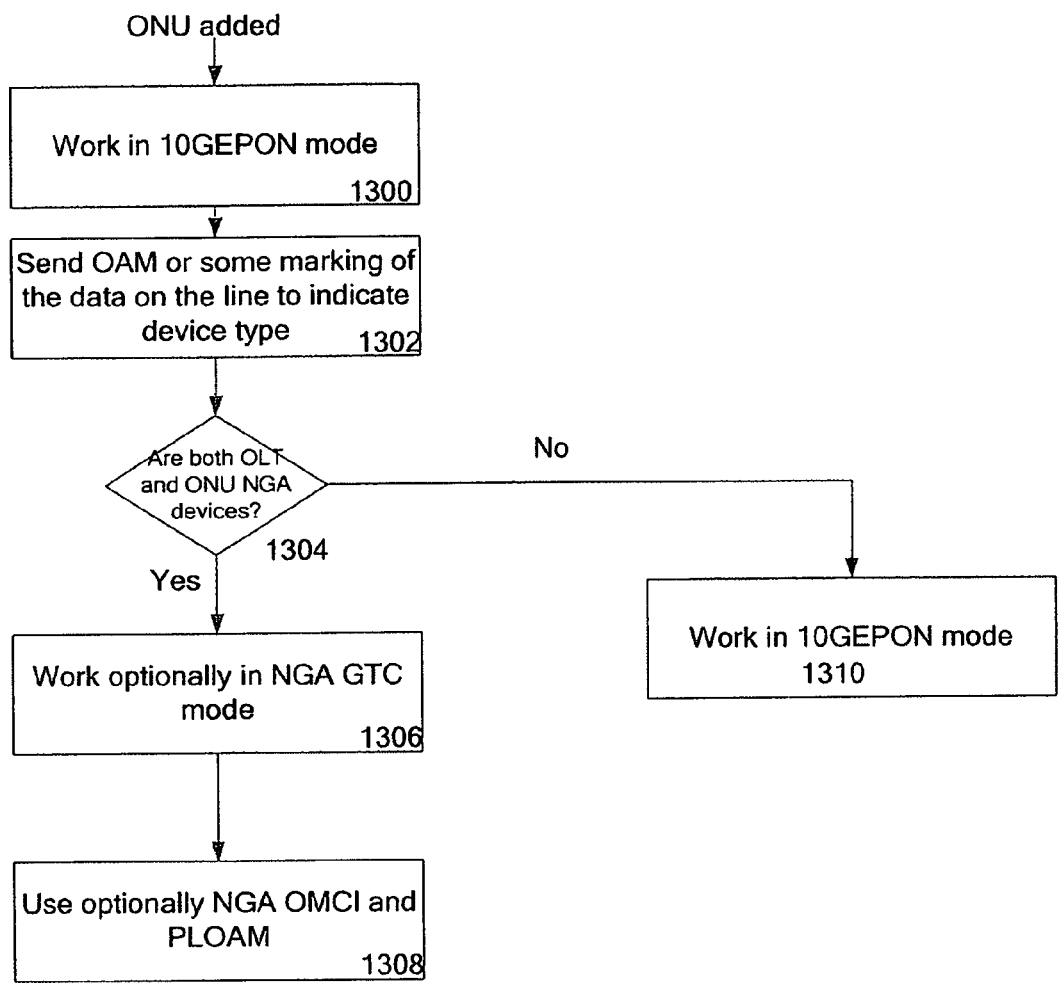
FIG. 13 shows a method for negotiation between a NGA OLT and a NGA ONU according to the invention.

FIG. 13 shows a method for negotiation between a NGA OLT and a NGA ONU according to the invention. The DS time is divided between MPCP and GTC control based frames—each can be selected in a superframe TQ of 500 μsec cycles. The amount of time superframes selected for each control method depends on the number of network units using it and can be limited to discovery time only if all devices are NGA type devices. The default operation between an ONU and an OLT is 10 GEPON mode-controlled in MPCP. Each time a new device is added to the NGA PON, it is checked to see it is a 10 GEPON device, using MPCP gating for a certain slot of transmission for this device once in a time interval. If the device is a 10 GEPON device, the control remains MPCP-based control. The NGA capability is exchanged between the devices either by a message (e.g. an OAM message) or by some marking in a data frame. If the unit is detected as an NGA device, it can be controlled by the NGA GTC level of protocol. In the flow chart of FIG. 13, the flow starts when an ONU is added, to define its mode of operation. The ONU starts to work with the OLT in 10 GEPON mode in step 1300. The negotiation starts to present the capabilities of the device in step 1302, either using some kind of packet (OAM) or by some marking on the data on the line. A decision according to the device on line is made in step 1304 to determine if both the OLT and ONU are NGA devices. If they are not, the 10 GEPON mode is continued in step 1310. If both devices are NGA, the NGA GTC mode described above can optionally be enabled in step 1306, and the NGA PLOAM and OMCI as described above can optionally be enabled in step 1308.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patent applications and publications mentioned in this specification are herein incorporated in their entirety by reference into the specification, to the same extent as if each individual patent application or publication was specifically and individually indicated to be incorporated herein by reference. In addition, citation or identification of any reference in this application shall not be construed as an admission that such reference is available as prior art to the present invention.

The invention claimed is:

1. A method for controlling transmission of data packets and for media access through a single next generation access (NGA) passive optical network (PON) comprising the steps of:
   a) at a first node of the network, providing a converged data packet;
   b) transmitting the converged data packet under NGA management control to a second node of the network; and
   c) at the second node, receiving the converged data packet and accepting the NGA management control.

2. The method of claim 1, wherein the step of transmitting is performed by a device selected from the group consisting of a first node NGA device and a first node legacy device and wherein the step of receiving is performed by a device selected from the group consisting of a second node NGA device and a second node legacy device.

3. The method of claim 1, wherein the step of providing a converged data packet includes providing a packet with a format that unifies a GEM header with a 10 GEPON preamble header.

4. The method of claim 3, wherein the providing a packet with a format that unifies a GEM header with a 10 GEPON preamble header includes providing a field used as both LLID for EPON devices and as a port ID for GPON devices.

5. The method of claim 4, wherein the providing a packet with a format that unifies a GEM header with a 10 GEPON preamble header further includes retaining two GPON PTI/PLI bytes before the LLID.

6. The method of claim 5, wherein the retaining includes retaining default value PTI/PLI bytes as EPON preamble values, thereby allowing reception by a legacy 10 GEPON device which ignores the PTI/PLI bytes.

7. The method of claim 2, wherein the first node NGA device is a NGA OLT and wherein the second node NGA device is a NGA ONU.

8. The method of claim 2, wherein the first node NGA device is a NGA ONU and wherein the second node NGA device is a NGA OLT.

9. The method of claim 1, wherein the NGA management control includes a protocol based on the IEEE802.3av multi-point control protocol (MPCP).

10. The method of claim 9, wherein the NGA management control includes a GPON based management extension using extended MPCP and OAM messages.

11. The method of claim 10, wherein the GPON based management extension is negotiated between a NGA ONU and a NGA OLT.

12. The method of claim 2, wherein the NGA management control includes a GPON transmission control (GTC) based protocol adapted for access between NGA devices.

13. The method of claim 12, wherein the NGA management control is done in 500 μsec superframe cycles of four GTC frames of 125 μsec shifted in 0-3 bytes.

14. The method of claim 12, wherein the GTC based protocol includes a GTC header encapsulated in NGA converged data packets to maintain compatibility with 10 GEPON device.

15. The method of claim 12, wherein the NGA management control includes a default NGA management control based on MPCP.

16. An apparatus for controlling transmission of data packets and for media access through a single next generation access (NGA) passive optical network (PON) comprising: an interface having:
   a) a NGA GEM encapsulator module;
   b) a NGA Framer PCS module;
   c) at least one NGA serializer/deserialzer (SERDES) and burst mode clock data recovery (CDR) engine; and
   d) a NGA optics module;
   wherein the NGA GEM encapsulator module is used for encoding and decoding a converged data packet, wherein the NGA Framer PCS module is used for encoding data received from the NGA GEM encapsulator module and for decoding data received from the SERDES/CDR engine, wherein the NGA SERDES/CDR is used for serializing the encoded data of the NGA Framer PCS module, for providing clock and data recovery and for deserializing data arriving from the NGA optical module, and wherein the NGA optics module is used for combining burst mode transmission to the line and burst mode reception to the NGA SERDES/CDR engine.

17. The apparatus of claim 16, wherein the interface is a NGA OLT interface.

18. The apparatus of claim 16, wherein the interface is a NGA ONU interface.

19. The apparatus of claim 17, wherein the NGA OLT interface further includes a PLOAM module connected to the OLT NGA framer module and used for providing GPON based NGA physical level management for the NGA OLT.

20. The apparatus of claim 19, wherein the NGA OLT interface further includes an OMCI module connected to the OLT NGA GEM encapsulator module and used for providing GPON based NGA higher level management for the NGA OLT.

21. The apparatus of claim 17, wherein the NGA OLT interface further includes an EPON OLT MAC module for 1 GEPON and 10 GEPON, an EPON OAM module and an OLT MPCP module, the EPON OLT MAC, EPON OAM and OLT MPCP modules connected to the OLT NGA GEM encapsulator module and used for enabling the NGA OLT to work with legacy 10 GEPON and 1 GEPON ONUs or NGA ONUs in EPON mode based on EPON and MPCP control.

22. The apparatus of claim 17, wherein the NGA OLT interface further includes a bandwidth allocator/manager module connected to the OLT MPCP module and the OLT NGA Framer PCS module and used for providing for the NGA OLT control of the allocation of bandwidth in upstream and for the separation of different control protocols in downstream and upstream TDM or WDM transmission.

23. The apparatus of claim 18, wherein the NGA ONU interface further includes a PLOAM module connected to the ONU NGA framer module and used for providing GPON based NGA physical level management for the NGA ONU.

24. The apparatus of claim 23, wherein the NGA ONU interface further includes an OMCI module connected to the ONU NGA GEM encapsulator module and used for providing GPON based NGA higher level management for the NGA ONU.

25. The apparatus of claim 18, wherein the NGA ONU interface further includes an EPON ONU MAC module for 1 GEPON and 10 GEPON, an EPON OAM module and an ONU MPCP module, the EPON ONU MAC, EPON OAM and ONU MPCP modules connected to the ONU NGA GEM encapsulator module and used for enabling the NGA ONU to work with legacy 10 GEPON and 1 GEPON OLTs or NGA OLTs in EPON mode based on EPON and MPCP control.

26. The apparatus of claim 18, wherein the NGA ONU interface further includes a bandwidth reporting module connected to the ONU MPCP module and the ONU NGA Framer PCS module and used for providing a NGA ONU a BW report in the upstream transmission in a GTC header for GTC based NGA operation, or for providing data to MPCP report messages in case of MPCP media access management.

* * * * *